UNITED STATES PATENT OFFICE.

WILLIAM J. FORD, OF COLUMBIA, MISSISSIPPI.

INSECTICIDE.

SPECIFICATION forming part of Letters Patent No. 633,509, dated September 19, 1899.

Application filed November 26, 1898. Serial No. 697,548. (No specimens.)

*To all whom it may concern:*

Be it known that I, WILLIAM J. FORD, a citizen of the United States, residing at Columbia, in the county of Marion and State of Mississippi, have invented new and useful Improvements in Insecticides, of which the following is a specification.

My invention relates to a fluid insecticide for use in spraying trees to remove or prevent blight and destroy vermin.

It is the object of my invention to provide a compound that will effectually exterminate all kinds of insects infesting trees and plants or other vegetation and which shall be comparatively inexpensive and capable of convenient application by spraying or otherwise.

The ingredients of my insecticide compound are as follows, mixed in about the proportions and in the manner set forth:

In preparing this compound I employ the following-named ingredients: strong infusion of the green leaves of the red laurel or stink-bush, two gallons; coal-oil, two gallons; green soap, (*sapo viridis*), two pounds; sulphur, two pounds; asafetida, three ounces; gum-camphor, three ounces.

The above-named ingredients are first thoroughly mixed in about the proportions stated, and afterward I add eight gallons of water and stir well. The mixture or liquid is to be well agitated before using, and it can be readily, conveniently, and effectively applied by means of any suitable spraying apparatus as an agent for removing or preventing blight on fruit-trees and for destroying insects and vermin on all kinds of vegetation.

For the purpose of preparing the strong solution of the leaves of red laurel above mentioned I take sixteen pounds of the green leaves, add four gallons of water, and boil down to two gallons. To this solution, when cool, are added the other ingredients of the fluid insecticide in the proportions and manner hereinbefore described. The red laurel or stink-bush (sometimes called "stink-bay") to which I refer is an evergreen bush or tree growing abundantly in swamps. It has thick green leaves four or five inches long by about half an inch broad, and is generally avoided by insects. I regard the strong infusion of these leaves as being one of the most important ingredients of my described fluid insecticide by reason of its effectiveness in killing insects, especially when this infusion of laurel-leaves is combined with coal-oil, sulphur, and the other named ingredients of my compound.

This compound does not merely repel insects, but possesses the destructive effects of a true and reliable insecticide.

What I claim as my invention is—

The herein-described compound, for use as a fluid insecticide and for the treatment and prevention of blight, consisting of a strong infusion of the green leaves of the red laurel, coal-oil, soap, sulphur, asafetida, gum-camphor, and water, in about the proportions set forth.

In testimony whereof I have hereunto set my hand in presence of two subscribing witnesses.

WILLIAM J. FORD.

Witnesses:
C. C. BUCKLEY,
J. T. BENNETT.